United States Patent
Park et al.

(10) Patent No.: US 12,518,799 B2
(45) Date of Patent: Jan. 6, 2026

(54) STORAGE DEVICES FOR POWER OPTIMIZATION, STORAGE SYSTEMS INCLUDING THE SAME, AND OPERATING METHODS THEREOF

(71) Applicant: Samsung Electronics Co., Ltd., Suwon-si (KR)

(72) Inventors: Chanwoo Park, Suwon-si (KR); Yu-Sung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 18/133,566

(22) Filed: Apr. 12, 2023

(65) Prior Publication Data
US 2024/0029764 A1 Jan. 25, 2024

(30) Foreign Application Priority Data

Jul. 25, 2022 (KR) .......................... 10-2022-0091505
Oct. 7, 2022 (KR) .......................... 10-2022-0128549

(51) Int. Cl.
*G11C 5/14* (2006.01)

(52) U.S. Cl.
CPC ........................................ *G11C 5/14* (2013.01)

(58) Field of Classification Search
CPC ........... G11C 5/14; G11C 5/148; G11C 16/30; G11C 16/32; G11C 5/147
See application file for complete search history.

(56) References Cited

U.S. PATENT DOCUMENTS

| | | | | |
|---|---|---|---|---|
| 7,224,563 B2* | 5/2007 | Naffziger | ............... | G06F 1/3296 361/115 |
| 7,500,122 B2* | 3/2009 | Won | ........................ | G06F 1/206 713/320 |
| 7,817,488 B2* | 10/2010 | Unger | ................... | G06F 1/3203 365/228 |
| 7,952,825 B2* | 5/2011 | Chu | .................... | G11B 5/59616 360/51 |
| 8,006,115 B2* | 8/2011 | Fischer | ................... | G06F 1/324 713/400 |
| 9,477,243 B2* | 10/2016 | Rotem | .................... | G06F 1/324 |
| 10,416,910 B1 | 9/2019 | Lai | | |

(Continued)

FOREIGN PATENT DOCUMENTS

CN 103185822 A 7/2013

*Primary Examiner* — Douglas King
*Assistant Examiner* — Christopher Lane Reece
(74) *Attorney, Agent, or Firm* — Wolf, Greenfield & Sacks, P.C.

(57) ABSTRACT

A storage device which includes a non-volatile memory, a storage controller that is connected with the non-volatile memory and is configured to calculate a real-time power value of the storage device through at least one current value and at least one voltage value received from an ADC module, and to generate a clock control signal based on the real-time power value. The ADC module may be connected with at least one line that supplies a power to the storage device, and the ADC module may measure the at least one current value and the at least one voltage value. The storage device may include a clock adjustment unit that adjusts a plurality of clock signals used to drive the storage controller based on the clock control signal and sends the plurality of clock signals to the storage controller.

20 Claims, 13 Drawing Sheets

(56) References Cited

U.S. PATENT DOCUMENTS

| | | |
|---|---|---|
| 11,061,580 B2 | 7/2021 | Kim et al. |
| 2017/0177225 A1 | 6/2017 | Mehta |
| 2020/0393978 A1 | 12/2020 | Brittner et al. |
| 2022/0197521 A1 | 6/2022 | Klein |

* cited by examiner

STORAGE DEVICES FOR POWER OPTIMIZATION, STORAGE SYSTEMS INCLUDING THE SAME, AND OPERATING METHODS THEREOF

CROSS-REFERENCE TO RELATED APPLICATIONS

This application claims priority under 35 U.S.C. § 119 to Korean Patent Application No. 10-2022-0091505 filed on Jul. 25, 2022, and to Korean Patent Application No. 10-2022-0128549 filed on Oct. 7, 2022, in the Korean Intellectual Property Office, and the entire contents of the above-identified applications are incorporated by reference herein.

BACKGROUND

Embodiments of the present disclosure described herein relate to storage devices for power optimization, storage systems including such storage devices, and operating methods of the storage devices.

A storage device, which includes a non-volatile memory, such as an embedded multi-media card (eMCC), universal flash storage (UFS), a solid state drive (SSD), or a memory card, is useful for storing or moving a large amount of data. Nowadays, storage devices may include a high-capacity non-volatile memory and/or may support increased functionality, such as a next-generation controller, and the power consumption of the storage device may increase as a result. Meanwhile, as the ESG (Environment, Social, Governance) management of companies becomes more important, power requirements for storage devices of the companies are becoming more subdivided and complex.

To optimize the power consumption of the storage device, for example, an existing enterprise storage device may add a physical delay to operations that are required when receiving and processing I/O commands from a host. However, because a person must directly control factors associated with power optimization according to delay, the above operation has a problem in terms of human resources or error occurrence. Also, the power optimization is again required when the structure of the storage device is changed.

SUMMARY

Some embodiments of the present disclosure provide a storage device that makes power optimization possible by calculating a power consumption of the storage device in real time and automatically adjusting a frequency of a driving clock signal of the storage device based on the calculated power consumption. Some embodiments of the present disclosure provide a storage system including such storage devices, and an operating method of such storage devices.

According to some embodiments, a storage device may include a non-volatile memory, a storage controller that is connected with the non-volatile memory and configured to calculate a real-time power value of the storage device using at least one current value and at least one voltage value received from an ADC module and configured to generate a clock control signal based on the real-time power value, wherein the ADC module is connected with at least one line that supplies power to the storage device, the ADC module is configured to measure the at least one current value and the at least one voltage value, the storage device further including a clock adjustment unit that adjusts a plurality of clock signals used to drive the storage controller based on the clock control signal and sends the plurality of clock signals to the storage controller.

For example, the storage controller may include a first core that calculates the real-time power value from the at least one current value and the at least one voltage value, and a second core that generates the clock control signal used to adjust a clock gear ratio set for each of the plurality of clock signals, based on a present value of the clock gear ratio and a result of a comparison of the real-time power value with a given power limit value.

For example, when the real-time power value is greater than the given power limit value and the present value of the clock gear ratio is greater than a given lower limit value, the second core may generate the clock control signal such that the clock gear ratio decreases.

For example, when the real-time power value is smaller than a difference between the given power limit value and a given margin value and the present value of the clock gear ratio is smaller than a given upper limit value, the second core may generate the clock control signal such that the clock gear ratio increases.

For example, when the storage device is in an idle state, the second core may generate the clock control signal such that the clock gear ratio is adjusted to a given lower limit value.

For example, when the storage device is in an active state, the second core may generate the clock control signal such that the clock gear ratio is between a given lower limit value and a given upper limit value.

For example, the first core may send the real-time power value to the second core periodically.

For example, the clock adjustment unit may include a clock oscillator that generates a reference clock, a plurality of phase locked loops (PLLs) that generate the plurality of clock signals by converting the reference clock depending on a plurality of components included in the storage device, and a plurality of clock gears that adjust the plurality of clock signals depending on the clock gear ratio.

According to some embodiments, an operating method of a storage device which includes a storage controller includes calculating a real-time power value of the storage device using at least one current value and at least one voltage value received from an ADC module, wherein the ADC module is connected with at least one line that supplies a power to the storage device and wherein the ADC module measures the at least one current value and the at least one voltage value, generating a clock control signal based on the real-time power value, adjusting a plurality of clock signals used to drive the storage controller based on the clock control signal, and sending the plurality of clock signals to the storage controller.

According to some embodiments, a storage system includes a host device, and a storage device connected with the host device. The storage device includes a non-volatile memory and a storage controller that is connected with the non-volatile memory, the storage controller configured to calculate a real-time power value of the storage device using at least one current value and at least one voltage value received from an ADC module, and generate a clock control signal based on the real-time power value, wherein the ADC module is connected with at least one line that supplies a power to the storage device and wherein the ADC module measures the at least one current value and the at least one voltage value, and a clock adjustment unit that adjusts a plurality of clock signals used to drive the storage controller based on the clock control signal and sends the plurality of clock signals to the storage controller.

BRIEF DESCRIPTION OF THE FIGURES

The above and other objects and features of the present disclosure will become apparent by describing in detail embodiments thereof with reference to the accompanying drawings.

DETAILED DESCRIPTION

Below, some embodiments of the present disclosure will be described with sufficient detail and clarity to permit those of ordinary skill in the art to implement the inventive concepts.

Figure 1:
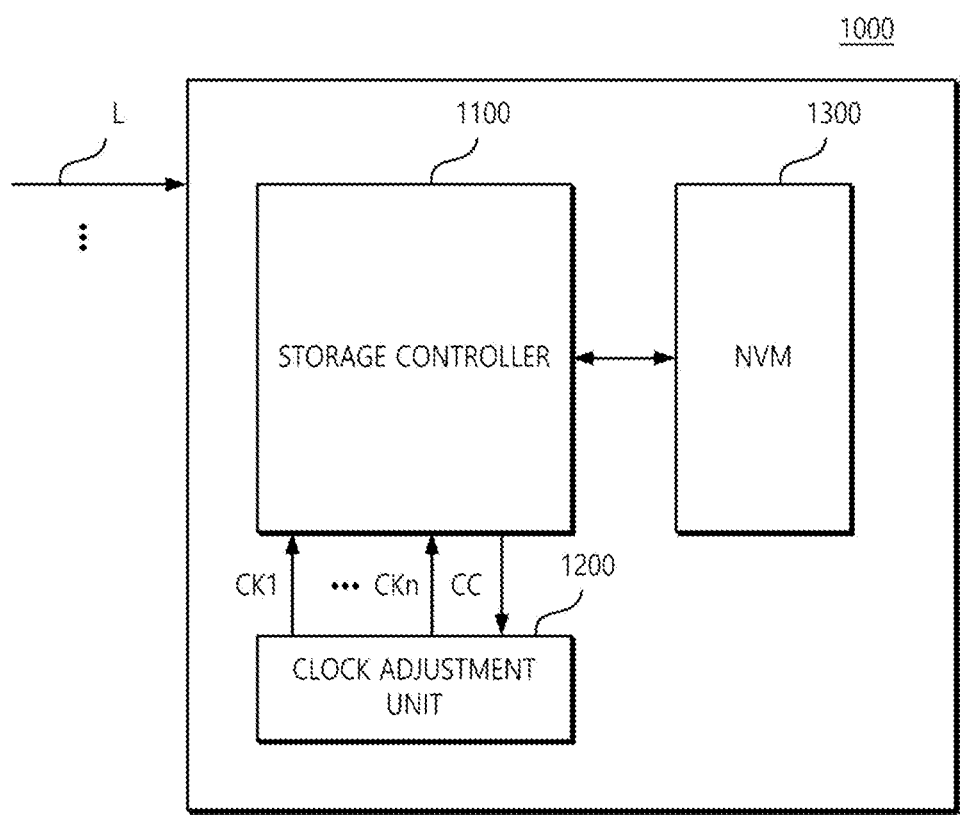
FIG. 1 is a diagram illustrating a storage device according to some embodiments of the present disclosure.

FIG. 1 is a diagram illustrating a storage device according to some embodiments of the present disclosure.

Referring to FIG. 1, a storage device 1000 according to some embodiments may include a storage controller 1100, a clock adjustment unit 1200, and a non-volatile memory (NVM) 1300.

In some embodiments, the storage device 1000 may be SSD, UFS, or eMMC. Alternatively, in some embodiments, the storage device 1000 may be implemented with a secure digital (SD) card, a micro SD card, a memory stick, a chip card, a universal serial bus (USB) card, a smart card, a compact flash (CF) card, and/or any other device similar thereto, with the understanding that the present disclosure is not limited thereto.

In some embodiments, the storage device 1000 may be implemented with a form factor, such as 3.5 inches, 2.5 inches, 1.8 inches, M.2, U.2, U.3, EDSFF (Enterprise and Data Center SSD Form Factor), or NF1 (New Form Factor 1), and/or a form factor similar thereto.

In some embodiments, the storage device 1000 may be implemented with an interface, such as serial ATA (Advanced Technology Attachment) SATA, small computer small interface (SCSI), or serial attached SCSI (SAS), and/or an interface similar thereto, and may be implemented in compliance with a protocol, such as peripheral component interconnect (PCI), PCI express (PCIe), non-volatile memory express (NVMe), NVMe-over-Fabrics (NVMe-oF), Ethernet, InfiniBand, or Fiber channel, and/or a protocol similar thereto.

The storage device 1000 may be supplied with power via at least one line "L," which may be an external line connected with a host device. The at least one line "L" may include a plurality of lines depending on the above form factor, interface, and/or protocol.

The storage controller 1100 may control and/or may be configured to control an overall operation of the storage device 1000.

In some embodiments, the storage controller 1100 may control the NVM 1300 connected with the storage controller 1100 depending on a host device (not shown) connected with the storage device 1000. For example, the storage controller 1100 may control the NVM 1300 in response to instructions and/or signals from the host device. The storage controller 1100 may perform a read operation, a write operation, and/or an erase operation on the NVM 1300, for example, by providing an address, a command, a control signal, etc. to the NVM 1300.

In some embodiments, the storage controller 1100 may calculate a real-time power consumption value and may generate a clock control signal CC depending on or based on the calculated real-time power consumption value. The storage controller 1100 may monitor the real-time power consumption value by calculating the power supplied to the storage device 1000 from the at least one line "L" supplying the power to the storage device 1000, that is, a total power consumption value of the storage device 1000. For example, the storage controller 1100 may calculate the real-time power consumption value from a voltage and a current that are applied to the at least one line "L." In some embodiments, where the at least one line "L" includes a plurality of lines, the storage controller 1100 may calculate a real-time power value based on a voltage value and a current value measured from each of the plurality of lines.

The above operation in which the storage controller 1100 calculates the real-time power value may be considered as a kind of interrupt. In some embodiments, the storage controller 1100 may calculate the real-time power value based on an interrupt service routine (ISR); in this case, the real-time power value may be calculated without affecting various background operations of the storage controller 1100.

In some embodiments, the storage controller 1100 may perform the real-time power value calculation operation every given update period. As described above, because the real-time power value calculation operation is considered as an interrupt, the update period may be set to various values without affecting the background operations. For example, when the update period set to 25 ms, the storage controller 1100 may calculate and update the real-time power value every 25 ms.

The storage controller 1100 may generate the clock control signal CC based on the calculated real-time power value. The clock control signal CC may refer to a signal for controlling or adjusting clock signals CK1 to CKn that are generated to drive the storage controller 1100 and any other intellectual property (IP) (not illustrated) or component of an upper level included in the storage device 1000. In some embodiments, the IP or component of the upper level may include a plurality of IPs or components, and the clock signals CK1 to CKn may be generated in a number equal to a number of IPs or components of the upper level; in this case, the clock control signal CC for controlling or adjusting the clock signals CK1 to CKn may be individually generated.

In some embodiments, when it is determined that there is a need to decrease the total power of the storage device 1000 due to the high real-time power value or when it is determined that there is a need to increase the total power due to the low real-time power value, the storage controller 1100 may generate the clock control signal CC for the purpose of adjusting a clock gear ratio. In the specification, the clock gear ratio may mean an adjustment ratio for stepwise adjusting the frequency of the clock signals CK1 to CKn. Accordingly, it may be understood as the frequency of the clock signals CK1 to CKn is adjusted depending on the clock gear ratio.

For example, when it is determined that the real-time power value is higher than a power demand value or a power limit value required by the storage device 1000, the storage controller 1100 may generate the clock control signal CC for decreasing a present value of the clock gear ratio. When the clock gear ratio is adjusted to be lower, the frequency of the clock signals CK1 to CKn may decrease; in this case, the power consumption of the storage device 1000 may decrease. Also, when it is determined that the real-time power value is lower than the power demand value or the power limit value required by the storage device 1000, the storage controller 1100 may generate the clock control signal CC for increasing a present value of the clock gear ratio. When the clock gear ratio is adjusted to be higher, the frequency of the clock signals CK1 to CKn may increase; in this case, the power consumption of the storage device 1000 may increase.

The clock adjustment unit 1200 may adjust (e.g., may automatically adjust) the plurality of clock signals CK1 to CKn for driving the storage controller 1100 depending on the clock control signal CC from the storage controller 1100 and may provide the storage controller 1100 with the plurality of clock signals CK1 to CKn thus adjusted. As such, the storage controller 1100 may optimize the power consumption of the storage device 1000 by controlling the storage device 1000 based on the clock signals CK1 to CKn whose frequency is adjusted depending on the real-time power value.

The NVM 1300 may be controlled by the storage controller 1100. The NVM 1300 may store data transferred from the host device, data generated by the storage device 1000, and/or various data written by the storage controller 1100. In some embodiments, the NVM 1300 may include an arbitrary non-volatile memory such as a NAND flash memory, a phase change random access memory (PRAM), a resistance random access memory (RRAM), a nano floating gate memory (NFGM), a polymer random access memory (PoRAM), a magnetic random access memory (MRAM), and/or a ferroelectric random access memory (FRAM), but the present disclosure is not limited thereto.

According to the above embodiments, the storage device 1000 of the present disclosure may optimize the power consumed or drawn by the storage device by calculating the total power consumption of the storage device 1000 in real time and automatically adjusting the frequency of the clock signals CK1 to CKn of the IP of the upper level, such as the storage controller 1100, depending on the calculated power consumption. In particular, because the power optimization is automatically performed such that the real-time power consumption value tracks the power demand value depending on the clock gear ratio control, when compared to the power optimization based on the operation of the existing storage device, issues such as resource consumption and a human error may be solved. Also, according to the present disclosure, because the power optimization is performed based on the real-time power value, the power optimization may be possible even though a factor or an environment of a storage device such as an input/output workload changes.

Below, some examples of various embodiments associated with the storage controller 1100 and the clock adjustment unit 1200 included in the storage device 1000 described above will be provided.

Figure 2:
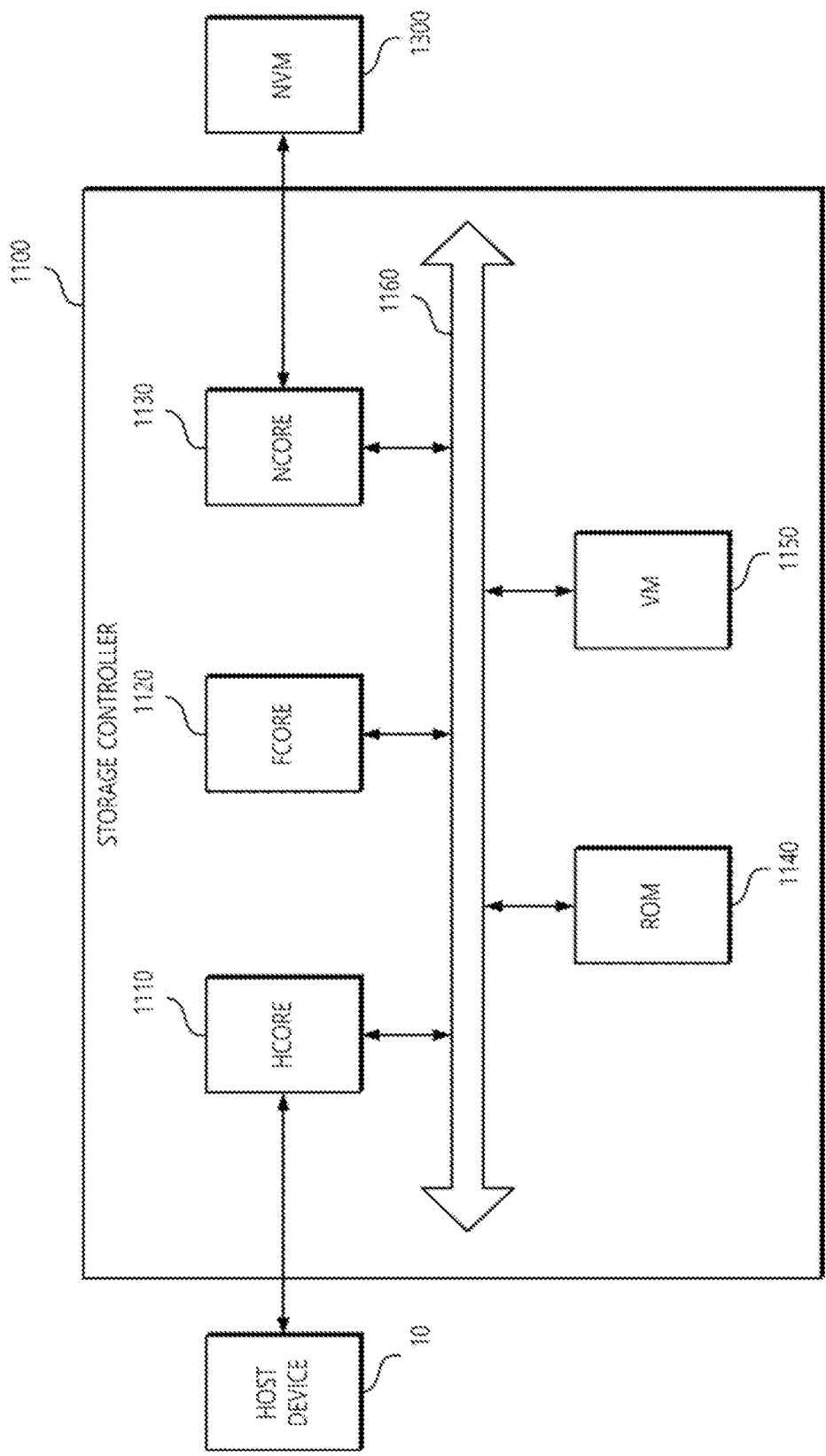
FIG. 2 is a diagram illustrating a storage controller according to some embodiments of the present disclosure.

FIG. 2 is a diagram illustrating a storage controller according to some embodiments of the present disclosure.

Referring to FIG. 2, the storage controller 1100 may include a plurality of cores 1110, 1120, and 1130, a ROM 1140, a volatile memory (VM) 1150, and a bus 1160 electrically connecting the components 1110, 1120, 1130, 1140, and 1150.

Each of the plurality of cores 1110, 1120, and 1130 may be implemented with an independent processor core. The plurality of cores 1110, 1120, and 1130 may include a host core 1110, a flash translation layer (FTL) 1120, and a NAND core 1130.

As will be described later, the host core 1110 may be defined as an internal core of the storage device 1000, which may be configured to perform at least one operation associated with a host interface layer (HIL). For example, the host core 1110 may process a request received from a host device 10. For example, the host core 1110 may perform the following operations of the storage controller 1100 according to the some embodiments: an operation of calculating a real-time power value and an operation of controlling the clock adjustment unit 1200 depending on the calculated real-time power value.

The storage controller 1100 may be connected with the host device 10 through the host core 1110. The host core 1110 provides an interface function between the storage device 1000 and the host core 1110. Through the host core 1110, the storage device 1000 may receive a command, data to be written in the NVM 1300, and/or any other data from the host device 10, and the storage device 1000 may send a response to the command, data read from the NVM 1300, and/or any other data to the host device 10 via the host core 1110.

The FTL core 1120 may be defined as an internal core of the storage device 1000, which may be configured to perform at least one operation associated with the FTL. For example, the FTL core 1120 may control the NAND core 1130 based on the request from the host core 1110 such that the read operation, the write operation, and/or the erase operation is performed in the NVM 1300. Alternatively, by using the FTL, the FTL core 1120 may perform an address mapping operation such that a logical block address LBA transferred from the host device 10 is mapped onto a physical block address PBA that is a physical location of the NVM 1300.

The NAND core 1130 may be defined as an internal core of the storage device 1000, which may be configured to perform at least one operation associated with a flash interface layer FIL. For example, the NAND core 1130 may perform operations for the NAND core 1130 under control of the FTL core 1120.

The storage controller 1100 may be connected with the NVM 1300 through the NAND core 1130. The NAND core 1130 may provide an interface function between the storage device 1000 and the NVM 1110. Through the NAND core 1130, the storage device 1000 may send data to be written in the NVM 1300 and/or may receive data read from the NVM 1300. For example, the NAND core 1130 may correct an error of the data by performing LDPC (Low Density Parity Checker) decoding on the data received from the host device 10 or the data stored in the VM 1150. For example, the NAND core 1130 may store the encoded data in the VM 1150 before storing the encoded data in the NVM 1300. For example, the NAND core 1130 may include a NAND signal processor (NSP) for processing a command, a request, or a response with the NVM 1300. For example, the NAND core 1130 may store the NAND-related command in a NAND queue. Herein, "LDPC", "NSP", and "NQ" may be defined as an IP of an upper level.

The ROM 1140 may store a code and data that may be used to drive the storage controller 1100. The VM 1150 may buffer and store the write data transferred from the host device 10 or the read data transferred from the NVM 1300. Also, in the initialization or booting process of the storage device 1000, a code and data that may be used to drive the storage controller 1100 may be loaded to the VM 1150.

An example in which the ROM 1140 and the VM 1150 are included in the storage controller 1100 is illustrated in FIG. 2, but the present disclosure is not limited thereto. For example, the ROM 1140 and/or the VM 1150 may be provided outside the storage controller 1100. In some embodiments, the VM 1150 may be implemented with a DRAM or an SRAM.

The bus 1160 may connect (e.g., may connect electrically) the plurality of cores 1110, 1120, and 1130, the ROM 1140, and the VM 1150 included in the storage controller 1100. For example, the bus 1160 may comply with the AMBA (Advanced Microcontroller Bus Architecture) protocol of the ARM Company. The AMBA protocol may support the following bus type: AHB (Advanced High-Performance Bus), APB (Advanced Peripheral Bus), AXI, AXI4, and/or ACE (AXI Coherency Extensions), but the present disclosure is not limited thereto.

Figure 3:
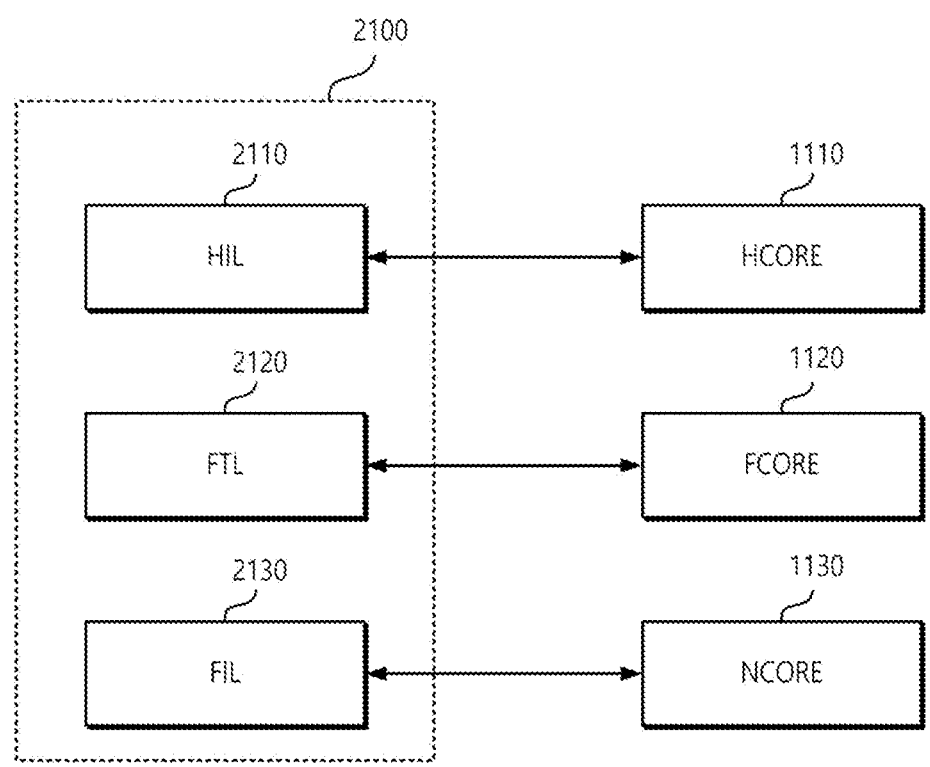
FIG. 3 is a diagram for describing a plurality of cores illustrated in FIG. 2.

FIG. 3 is a diagram for describing a plurality of cores illustrated in FIG. 2.

Referring to FIG. 3, the software such as firmware of the storage device 1000 may have a hierarchical (or layer) structure 2100 of an HIL 2110, an FTL 2120, and an FIL 2130.

As described above, the plurality of cores 1110, 1120, and 1130 include the host core 1110, the FTL core 1120, and the NAND core 1130, which respectively control the HIL 2110, the FTL 2120, and the FIL 2130 constituting the software hierarchical structure 2100 of the storage device 1000. For example, by using the HIL 2110, the host core 1110 may control operations of receiving data from the host device 10 and storing the received data in the NVM 1300. For example, the FTL core 1120 may perform the address mapping operation by using the FTL 2120. For example, the NAND core 1130 may provide the data stored in the ROM 1140 to the NVM 1300 by using the FIL 2130.

Also, the host core 1110 may perform the following operations of the storage controller 1100 according to the above embodiments: an operation of calculating a real-time power value and an operation of controlling the clock adjustment unit 1200 based on or depending on the calculated real-time power value.

Figure 4A:
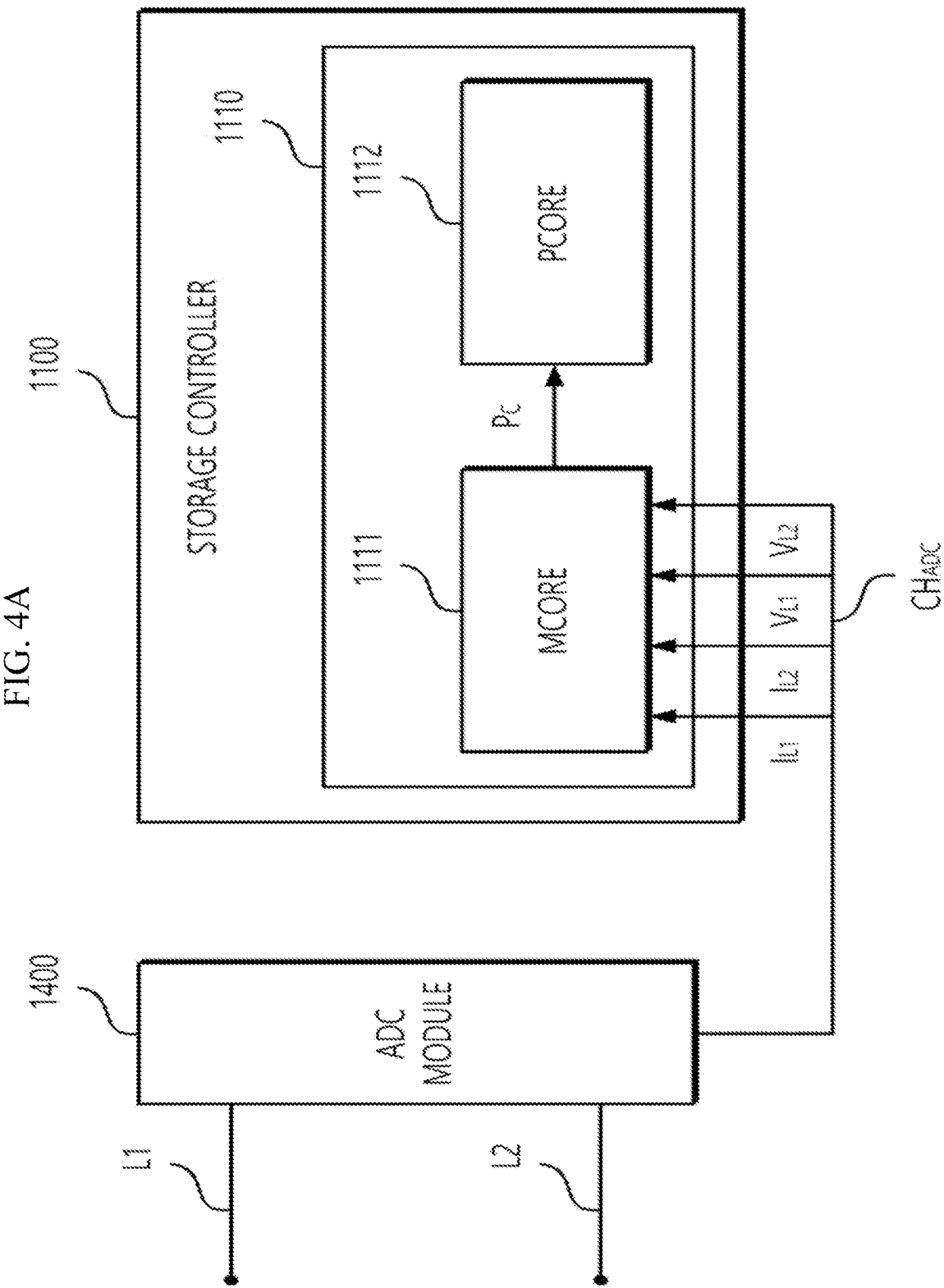
FIGS. 4A and 4B are diagrams illustrating structures of storage devices and operations of host cores, according to some embodiments of the present disclosure.
Figure 4B:
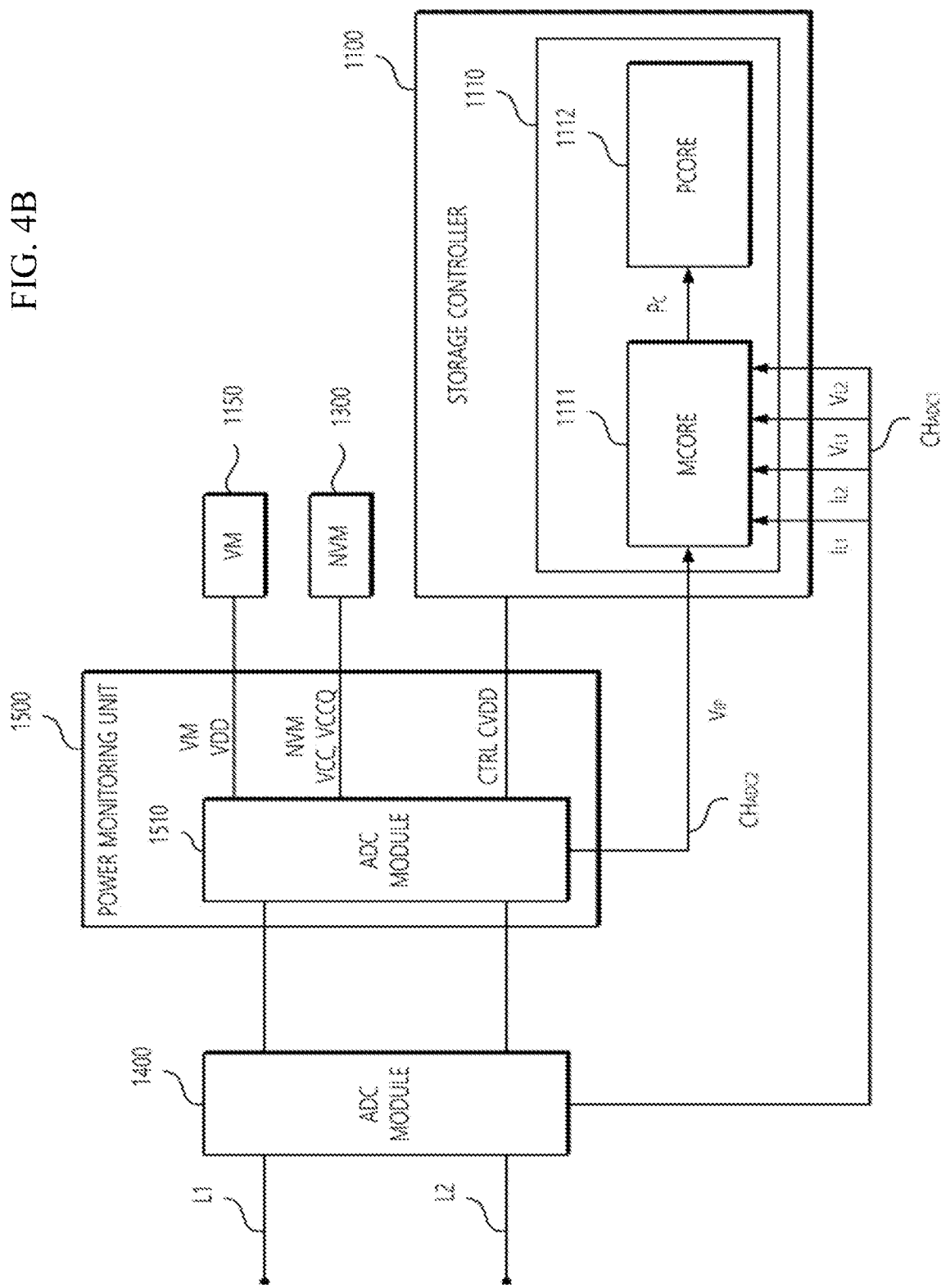

FIGS. 4A and 4B are diagrams illustrating structures of storage devices and operations of host cores, according to various embodiments of the present disclosure.

Referring to FIG. 4A, the storage device 1000 may further include an ADC module 1400 in addition to the storage controller 1100 described above.

The ADC module 1400 may be configured to detect an analog signal of a physical parameter such as a voltage, a current, or a temperature, and may be configured to convert the analog signal into a digital value. For example, the ADC module 1400 may be connected with at least one line L1 or L2 and may measure at least one current value and at least one voltage value from the at least one line L1 or L2. For example, when the at least one line L1 or L2 includes a plurality of lines, a current value and a voltage value may be obtained from each of the plurality of lines. The ADC module 1400 may convert analog values of the measured current and the measured voltage into digital values.

The ADC module 1400 may be configured to transfer the measured current and voltage values to the host core 1110 through a plurality of ADC channels $CH_{ADc}$. In some embodiments, the plurality of ADC channels $CH_{ADc}$ may be configured to transfer the current values and the voltage values to the host core 1110 in compliance with an inter-integrated circuit (I2C) or SMBus protocol. For example, when the at least one line L1 or L2 includes two lines as illustrated in FIG. 4A, the plurality of ADC channels $CH_{ADc}$ may transfer a current value $I_{L1}$ of the first line L1, a voltage value $V_{L1}$ of the first line L1, a current value $I_{L2}$ of the second line L2, and a voltage value $V_{L2}$ of the second line L2 to the host core 1110.

The storage controller 1100 may include the host core 1110 as described with reference to FIGS. 2 and 3, and the host core 1110 according to some embodiments may include a management core 1111 and a performance core 1112. For convenience, in the specification, the management core 1111 may be referred to as a "first core", and the performance core 1112 may be referred to as a "second core." The first and second cores may be sub-cores of the host core 1110.

The management core 1111 may control an overall management operation of the storage controller 1100. In some embodiments, the management core 1111 may receive at least one current value and at least one voltage value from the ADC module 1400 through the plurality of ADC channels $CH_{ADC}$, and may calculate a real-time power value $P_C$ from the at least one current value and the at least one voltage value.

In some embodiments, when the first line L1 is a 5-V line and the second line L2 is a 12-V line, the management core 1111 may calculate a current value of the first line L1 by using $$I_{5V\_EXT}[mA] = \frac{x_{CH4} \times 323}{10000} - 250$$

(hereinafter referred to as "Equation 1"), may calculate a voltage value of the first line L1 by using $$I_{5V\_EXT}[V] = \left(\frac{x_{CH1}}{33} - 190\right) \times \frac{1009}{100000}$$

(hereinafter referred to as "Equation 2"), may calculate a current value of the second line L2 by using $$I_{125V\_EXT}[mA] = \frac{x_{CH2} \times 317}{10000} - 232$$

(hereinafter referred to as "Equation 3"), and may calculate a voltage value of the second line L2 by using $$I_{12V\_EXT} = [V] = \left(\frac{x_{CH3}}{33} - 190\right) \times \frac{433}{100000}$$

(hereinafter referred to as "Equation 4"). Herein, $x_{CH1}$, $x_{CH2}$, $x_{CH3}$, and $x_{CH4}$ that are the ADC channels respectively indicate a channel transferring the voltage value of the first line L1, a channel transferring the current value of the second line L2, a channel transferring the voltage value of the second line L2, and a channel transferring the current value of the first line L1. The present disclosure is not limited to the above relationship between the ADC channels and the voltages and currents of the first and second lines L1 and L2 (e.g., in some embodiments, the current of the first line L1 may be communicated from the ADC module 1400 on channel $x_{CH2}$ and the current of the second line L2 may be communicated from the ADC module 1400 on channel $x_{CH4}$). In some embodiments, rather than the above constant values, other constant values may be determined and used to convert the received values from the ADC module to the current values and voltage values. For example, Equation 1 may be presented generically as $\alpha x_{CH4}+\beta$, Equation 2 may be presented generically as $\gamma x_{CH1}+\delta$, and so on.

In some embodiments, the management core 1111 may be configured to obtain a trend line of a linear equation obtained based on an operation (e.g., interpolation) of comparing the converted digital value with the analog value before conversion and may define Equation 1 to Equation 4 based on the corresponding trend line.

In some embodiments, the management core 1111 may calculate a power value of each line and the real-time power value $P_C$ of the storage device 1000 from the current value and the voltage value of each line obtained through Equation 1 to Equation 4. For example, the management core 1111 may calculate the power value of the first line L1 based on $P_{SV_{EXT}}[mW]=V_{SV_{EXT}} \times I_{SV_{EXT}}$ (hereinafter referred to "Equation 5"), may calculate the power value of the second line L2 based on $P_{12V_{EXT}}[mW]=V_{12V_{EXT}} \times I_{12V_{EXT}}$ (hereinafter referred to "Equation 6"), and may calculate the total real-time power value $P_C$ of the storage device 1000 based on $P_C[mW]=P_{SV_{EXT}}+P_{12V_{EXT}}$ (hereinafter referred to "Equation 7").

The above embodiments are associated with the case where at least one line L1 or L2 includes two lines, but the present disclosure is not limited thereto. For example, the management core 1111 may calculate the real-time power value $P_C$ from the current value and the voltage value measured from the at least one line L1 or L2 through various algorithms.

The management core 1111 may transfer the calculated real-time power value $P_C$ to any other core (e.g., the performance core 1112, the FTL core 1120, or the NAND core 1130) and/or may transfer the calculated real-time power value $P_C$ to the host device 10 through the host core 1110.

Referring to FIG. 4B, a plurality of ADC modules may be provided. The storage device 1000 according to some embodiments may include a plurality of ADC modules and a power monitoring unit 1500 including one ADC module, in addition to the storage controller 1100.

The operation of the first ADC module 1400 may be identical to that described with reference to FIG. 4A. The first ADC module 1400 may be configured to transfer the current and voltage values $I_{L1}$, $I_{L2}$, $V_{L1}$, and $V_{L2}$ measured from the at least one line L1 or L2 to the management core 1111 through a first ADC channel $CH_{ADC1}$.

The power monitoring unit 1500 may include a second ADC module 1510 and may be configured to monitor the power of the storage device 1000 in real time. Like the first ADC module 1400, the second ADC module 1510 may be connected with the at least one line L1 or L2 to receive the power; in this case, the second ADC module 1510 may measure an analog signal of a driving voltage from a plurality of IPs (e.g., the storage controller 1100, the NVM 1300, or the VM 1150) connected with the second ADC module 1510 and may convert the analog signal into a digital value. For example, as illustrated in FIG. 4B, the second ADC module 1510 may measure a voltage value $V_{IP}$ from a driving voltage VM VDD of the VM 1150, driving voltages NVM VCC and VCCQ of the NVM 1300, and a driving voltage CTRL CVDD of the storage controller 1100. The second ADC module 1510 may be configured to transfer the voltage value $V_{IP}$ measured from the plurality of IPs to the management core 1111 through a second ADC channel $CH_{ADC2}$.

In some embodiments, the management core 1111 illustrated in FIGS. 4A and 4B described above may send the real-time power value $P_C$ to the performance core 1112 every update period. That is, the management core 1111 may calculate the real-time power value $P_C$ every given update period. As described above, the update period may be set to a value that does not affect the background operations of the storage device 1000.

The management core 1111 according to the above embodiments may receive a current value and a voltage value of the power supply line from the ADC module in real time and may calculate the total power value of the storage device 1000 in real time. Accordingly, because the performance core 1112 to be described later may adjust the clock gear ratio based on the total power value in real time, power optimization may be performed (e.g., may be performed efficiently) even in a change in an environment of the storage device 1000, such as an operation or an input/output workload.

The performance core 1112 illustrated in FIGS. 4A and 4B may be configured to generate a clock control signal for adjusting the clock gear ratio, based on a result of comparing the real-time power value $P_C$ received from the management core 1111 with a given power limit value and a present value of the clock gear ratio set for each of a plurality of clock signals generated from the clock adjustment unit 1200. In the specification, the operation of adjusting the clock gear ratio through the real-time power value $P_C$ may be referred to as "dynamic adaptive clock gearing (ACG)". Below, a dynamic ACG operation of the performance core 1112 will be described in detail with reference to FIG. 5.

Figure 5:
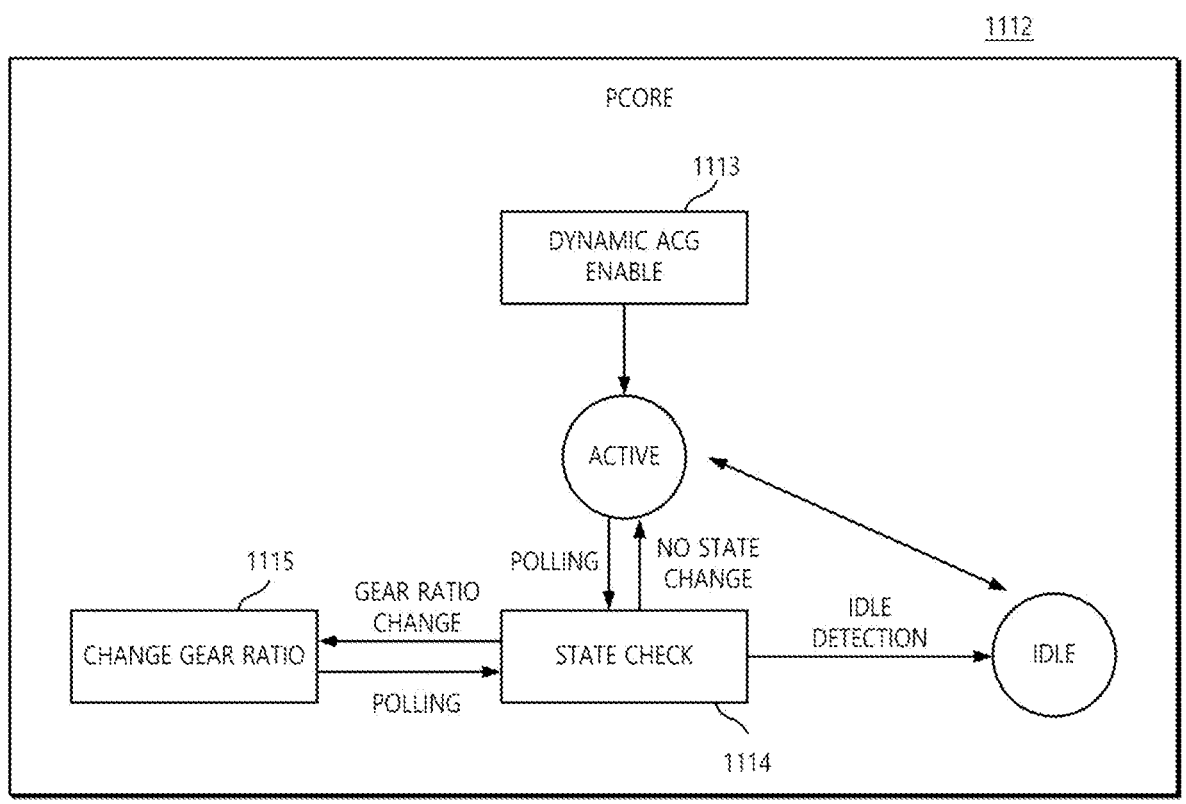
FIGS. 5 and 6 are diagrams for describing an operation of a performance core according to some embodiments of the present disclosure.
Figure 6:
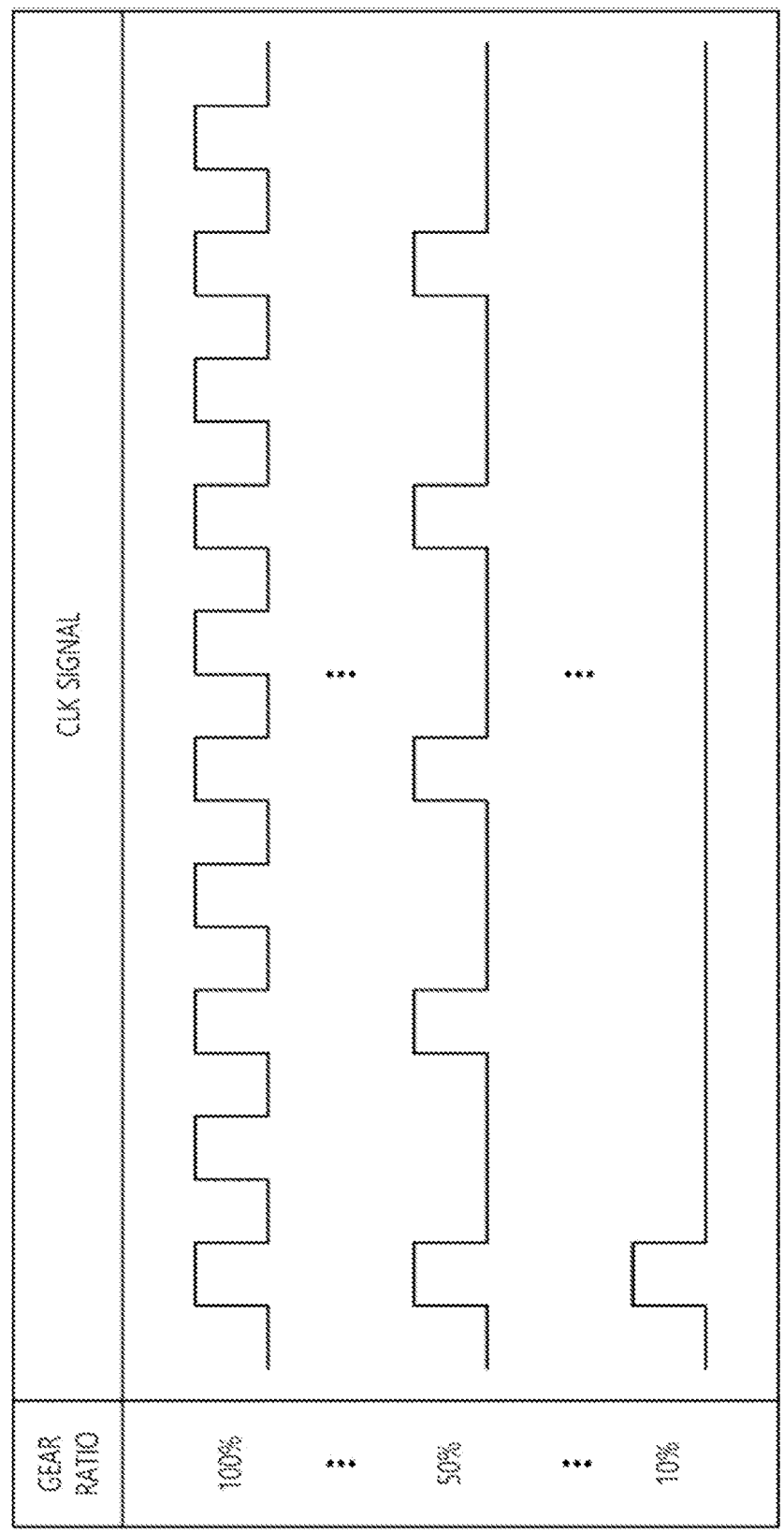

FIGS. 5 and 6 are diagrams for describing an operation of a performance core according to some embodiments of the present disclosure.

Referring to FIGS. 5 and 6, the performance core 1112 may include dynamic ACG enable logic 1113, state check logic 1114, and clock gear ratio adjustment logic 1115. It will be understood that the performance core 1112 may perform operations of the dynamic ACG enable logic 1113, the state check logic 1114, and the clock gear ratio adjustment logic 1115, which will be described later.

When the power is supplied to the storage device 1000, the dynamic ACG enable logic 1113 may enable the dynamic ACG. The operation of enabling the dynamic ACG may refer to an operation of reading a special function register (SFR) allocated for the dynamic ACG through firmware. As the dynamic ACG is enabled, the performance core 1112 may declare clock gear ratio values defined in advance.

In some embodiments, the clock gear ratio may be defined as a value included within a range from a given lower limit value to a given upper limit value and may have a stepwise value. For example, when a step value is set to "s" (s being a real number greater than "0"), the clock gear ratio may be defined as follows: a lower limit value, a lower limit value+s, a lower limit value+2s, . . . , an upper limit value. For example, as illustrated in FIG. 6, when the lower limit value is 10%, the upper limit value is 100%, and the step value is 10, the clock gear ratio may be defined as follows: 10, 20, . . . , 100.

When the dynamic ACG is enabled, the performance core 1112 sets the storage device 1000 to an active state. The storage controller 1100 controls the storage device 1000 in the active state.

In the active state, the state check logic 1114 periodically receives polling and checks whether the storage device 1000 is in the active state or an idle state, depending on the polling. The idle state refers to a state in which the host device 10 does not send data to the storage device 1000. In the idle state, the storage device 1000 performs only background operations without input/output and maintains a low-power state. When there is no state change, the state check logic 1114 may provide notification that there is no state change.

When the idle state is detected, the state check logic 1114 switches the state of the storage device 1000 to the idle state. When a command is received from the host device 10 in the idle state and/or when a power loss protection (PLP) event occurs, the state check logic 1114 may switch the state of the storage device 1000 to the active state.

The state check logic 1114 requests the clock gear ratio adjustment logic 1115 to change the clock gear ratio. The clock gear ratio adjustment logic 1115 adjusts the clock gear ratio depending on the state of the storage device 1000.

In some embodiments, in the active state, to adjust the clock gear ratio, first, the clock gear ratio adjustment logic 1115 compares the real-time power value received from the management core 1111 with the given power limit value. Also, the clock gear ratio adjustment logic 1115 compares the present value of the clock gear ratio with the given lower limit value or the given upper limit value. The power limit value may refer to a power demand value defined by an original equipment manufacturer (OEM), defined by other companies or users using the storage device 1000, or defined by the host device 10.

When the real-time power value is greater than the given power limit value and the present value of the clock gear ratio is greater than the given lower limit value, the clock gear ratio adjustment logic 1115 may decrease the clock gear ratio. The decrement of the clock gear ratio may be defined depending on the step value described above. For example, the clock gear ratio adjustment logic 1115 may decrease the clock gear ratio as much as one step value.

When the real-time power value is smaller than a difference between the given power limit value and the given margin value and the present value of the clock gear ratio is smaller than the given upper limit value, the clock gear ratio adjustment logic 1115 may increase the clock gear ratio. Herein, the margin value refers to a value that is set such that the dynamic ACG operation is not performed too frequently. The increment of the clock gear ratio may be defined depending on the step value; for example, the clock gear ratio adjustment logic 1115 may increase the clock gear ratio as much as one step value.

When the performance core 1112 intends to adjust (decrease or increase) the clock gear ratio depending on the operations of the logics described above, the performance core 1112 may generate a clock control signal for decreasing or increasing the clock gear ratio and may transfer the clock control signal to the clock adjustment unit 1200.

In some embodiments, when the storage device 1000 is in the idle state, the clock gear ratio adjustment logic 1115 may adjust the present value of the clock gear ratio to the lower limit value. Accordingly, the second core may generate a clock control signal for adjusting the clock gear ratio to the lower limit value.

The storage controller 1100 according to the above embodiments may automatically perform power optimization by adjusting the clock gear ratio depending on the real-time power value through the performance core 1112. Therefore, when compared to the conventional power optimization technique based on the operation of the storage device 1000, issues such as a human resource and a human error may be solved or reduced. Also, even though the power limit value being the power demand value is changed, the power may be optimized to correspond to the changed value.

Below, the clock adjustment unit 1200 included in the storage device 1000 will be described.

Figure 7:
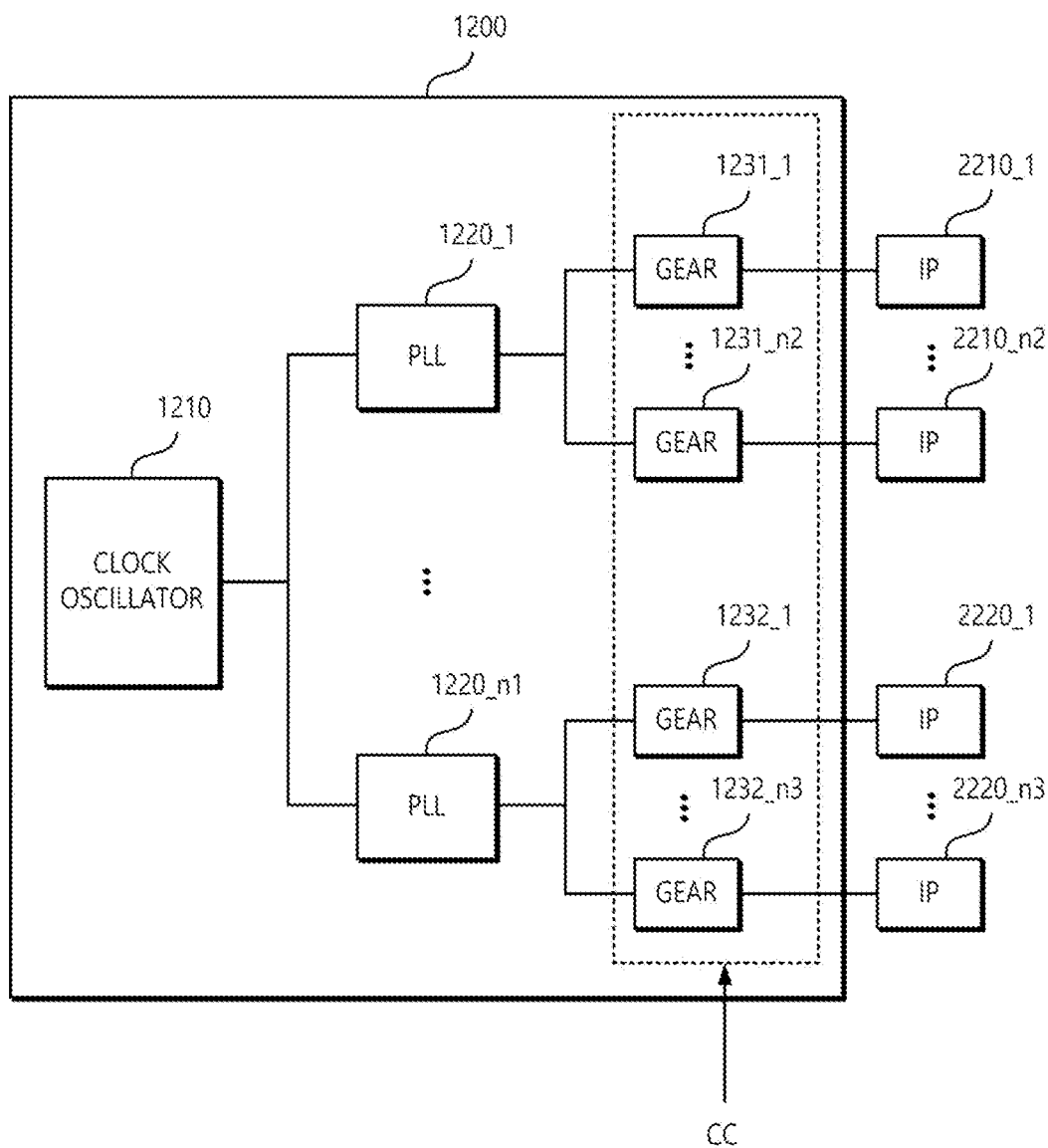
FIG. 7 is a diagram illustrating a clock adjustment unit according to some embodiments of the present disclosure.

FIG. 7 is a diagram illustrating a clock adjustment unit according to some embodiments of the present disclosure.

Referring to FIG. 7, the clock adjustment unit 1200 according to an embodiment may include a clock oscillator 1210, a plurality of phased locked loops (PLLs) 1220_1 to 1220_$n$1, and a plurality of clock gears 1231_1 to 1231_$n$2 and 1232_1 to 1232_$n$3.

The clock oscillator 1210 may generate a reference clock for driving the storage device 1000. Although not illustrated, the clock oscillator 1210 according to some embodiments may generate the reference clock for driving the storage device 1000 based on a reference clock received from the host device 10. The clock oscillator 1210 may transfer the generated reference clock to the plurality of PLLs 1220_1 to 1220_$n$1.

The plurality of PLLs 1220_1 to 1220_$n$1 may generate a plurality of clock signals by converting the reference clock depending on a plurality of IPs 2210_1 to 2210_$n$2 and 2220_1 to 2220_$n$3 included in the storage device 1000. Each of the plurality of PLLs 1220_1 to 1220_$n$1 may be provided depending on a characteristic or a kind of an IP connected therewith. For example, when some of the plurality of IPs 2210_1 to 2210_$n$2 and 2220_1 to 2220_$n$3 are associated with a specific layer of the storage device 1000, a PLL connected with some of the IPs may generate a clock signal for driving the IPs associated with the specific layer from the reference clock. A plurality of IPs 2210_1 to 2210_$n$2 and a plurality of clock gears 1231_1 to 1231_$n$2 may be connected to one PLL 1220_1.

The plurality of clock gears 1231_1 to 1231_$n$2 and 1232_1 to 1232_$n$3 may adjust a plurality of clock signals generated from the PLLs 1220_1 to 1220_$n$1, based on the clock gear ratio. The plurality of clock gears 1231_1 to 1231_$n$2 and 1232_1 to 1232_$n$3 are respectively connected with the plurality of IPs 2210_1 to 2210_$n$2 and 2220_1 to 2220_$n$3. The plurality of clock gears 1231_1 to 1231_$n$2 and 1232_1 to 1232_$n$3 may adjust the clock gear ratio depending on the clock control signal generated from the performance core 1112 and may adjust the frequency of the clock signal depending on the adjusted clock gear ratio. The plurality of clock gears 1231_1 to 1231_$n$2 and 1232_1 to 1232_$n$3 may be controlled to have the same or different clock gear ratios. As described above, the plurality of clock gears 1231_1 to 1231_$n$2 and 1232_1 to 1232_$n$3 may operate based on the clock gear ratio that is increased or decreased for each step value between the lower limit value and the upper limit value.

Each of the plurality of IPs 2210_1 to 2210_n2 and 2220_1 to 2220_n3 may receive the clock signal whose frequency is adjusted, from the corresponding clock gear connected therewith from among the plurality of clock gears 1231_1 to 1231_n2 and 1232_1 to 1232_n3, and each of the plurality of IPs 2210_1 to 2210_n2 and 2220_1 to 2220_n3 may operate depending on the adjusted clock signal.

Figure 8:
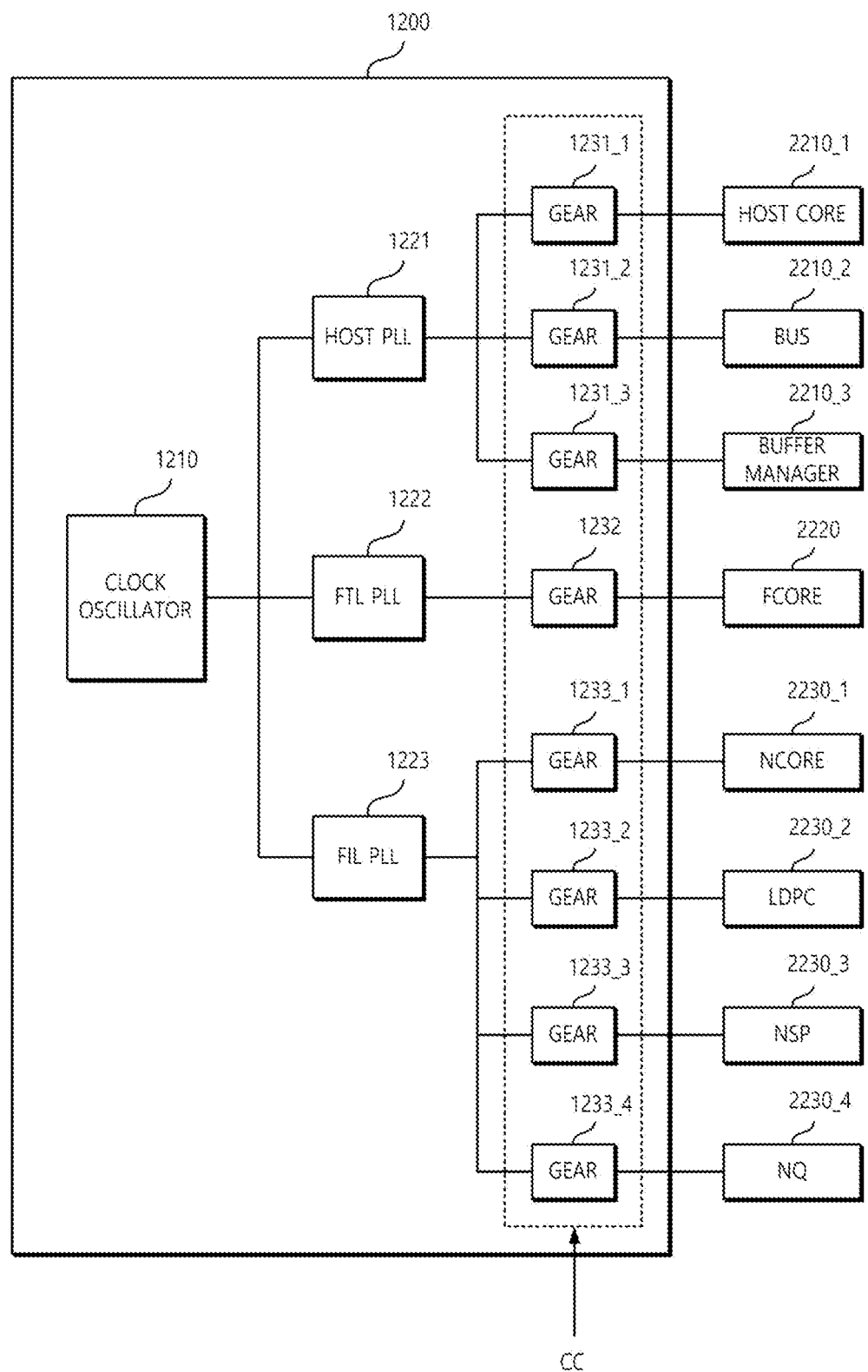
FIG. 8 is a diagram illustrating a clock adjustment unit according to some embodiments of the present disclosure.

FIG. 8 is a diagram illustrating a clock adjustment unit according to some embodiments of the present disclosure.

Referring to FIG. 8, the clock adjustment unit 1200 according to some embodiments includes a host PLL 1221, an FTL PLL 1222, and an FIL PLL 1223 as a plurality of PLLs. The host PLL 1221 may convert the reference clock into a clock signal for driving IPs related to the HIL described above. The FTL PLL 1222 may convert the reference clock into a clock signal for driving IPs associated with the FTL described above. The FIL PLL 1223 may convert the reference clock into a clock signal for driving IPs associated with the FIL described above.

Some (e.g., 1231_1 to 1231_3) of the plurality of clock gears 1231_1 to 1231_3, 1232, and 1233_1 to 1233_4 may be connected with the host PLL 1221, others (e.g., 1232) thereof may be connected with the FTL PLL 1222, and the others (e.g., 1233_1 to 1233_4) thereof may be connected with the FIL PLL 1223. The clock gears 1231_1 to 1231_3 connected with the host PLL 1221 may adjust the clock signal converted by the host PLL 1221. The clock gear 1232 connected with the FTL PLL 1222 may adjust the clock signal converted by the FTL PLL 1222. The clock gears 1233_1 to 1233_4 connected with the FIL PLL 1223 may adjust the clock signal converted by the FIL PLL 1223. The plurality of clock gears 1231_1 to 1231_3, 1232, and 1233_1 to 1233_4 may operate depending on the clock control signal CC generated from the performance core 1112. The clock control signal CC may collectively change the clock gear ratios of the plurality of clock gears or may change the clock gear ratio of each of the plurality of clock gears.

The plurality of IPs may be interworked with any one of the host PLL 1221, the FTL PLL 1222, and the FIL PLL 1223 and may operate based on the clock signal converted by the PLL interworked therewith. In some embodiments, a host core 2210_1, a bus 2210_2, and a buffer manager 2210_3 may be interworked with the host PLL 1221 and may operate depending on the clock signal converted by the host PLL 1221. In this case, the buffer manager 2210_3 may refer to an IP that manages buffers included in the storage device 1000 in association with the FIL. In some embodiments, the FTL core 2220 may be interworked with the FTL PLL 1222 and may operate depending on the clock signal converted by the FTL PLL 1222. In some embodiment, a NAND core 2230_1, an LDPC 2230_2 (which may be an IP associated with the above NAND), an NSP 2230_3, and an NQ 2230_4 may be interworked with the FIL PLL 1223 and may operate depending on the clock signal converted by the FIL PLL 1223.

Below, an operating method of the storage device 1000 according to the above and other embodiments will be described. Some of the description that would be identical to the above-provided description will be omitted here to avoid redundancy.

Figure 9:
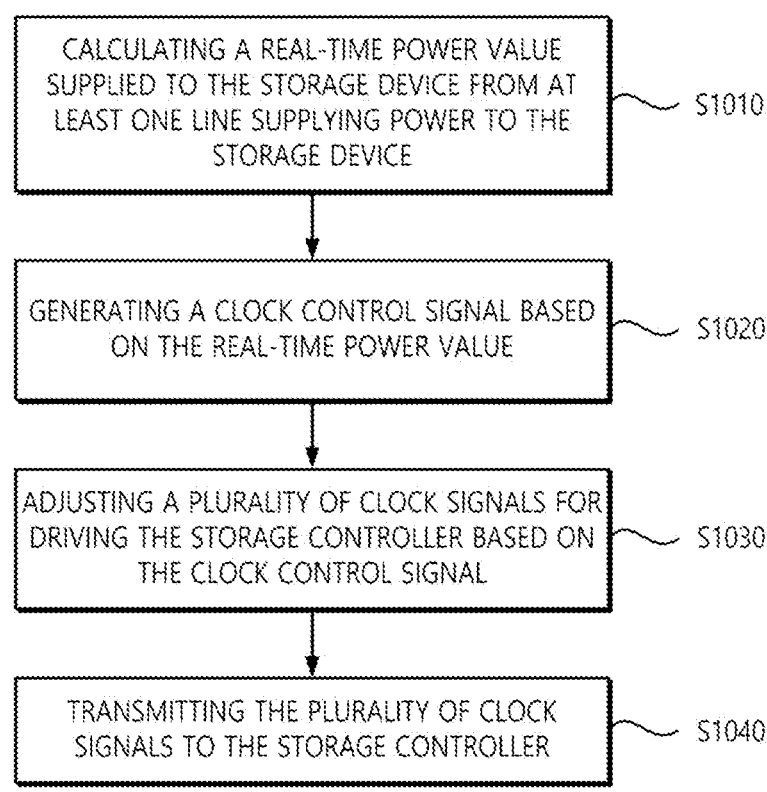
FIG. 9 is a flowchart of an operating method of a storage device according to some embodiments of the present disclosure.

FIG. 9 is a flowchart of an operating method of a storage device according to some embodiments of the present disclosure.

Referring to FIG. 9, in some embodiments, the storage device 1000 may calculate a real-time power value of the storage device 1000 from at least one line supplying the power to the storage device 1000 (S1010). The real-time power value may be calculated based on a current value and a voltage value measured from the at least one line.

The storage device 1000 may generate a clock control signal based on the real-time power value calculated in operation S1010 (S1020). The clock control signal may be generated by the storage controller 1100, and the generated clock control signal may be transferred to the clock adjustment unit 1200.

The storage device 1000 may adjust a plurality of clock signals for driving the storage controller 1100 depending on the clock control signal (S1030). The clock gear ratio of the clock control unit 1200 may be adjusted depending on the clock control signal, and thus, the frequency of the clock signal may be adjusted.

The storage device 1000 may send the plurality of clock signals adjusted in operation S1030 to the storage controller 1100 (S1040). The storage controller 1100 may control IPs included in the storage device 1000 based on the clock signal whose frequency is adjusted.

Figure 10:
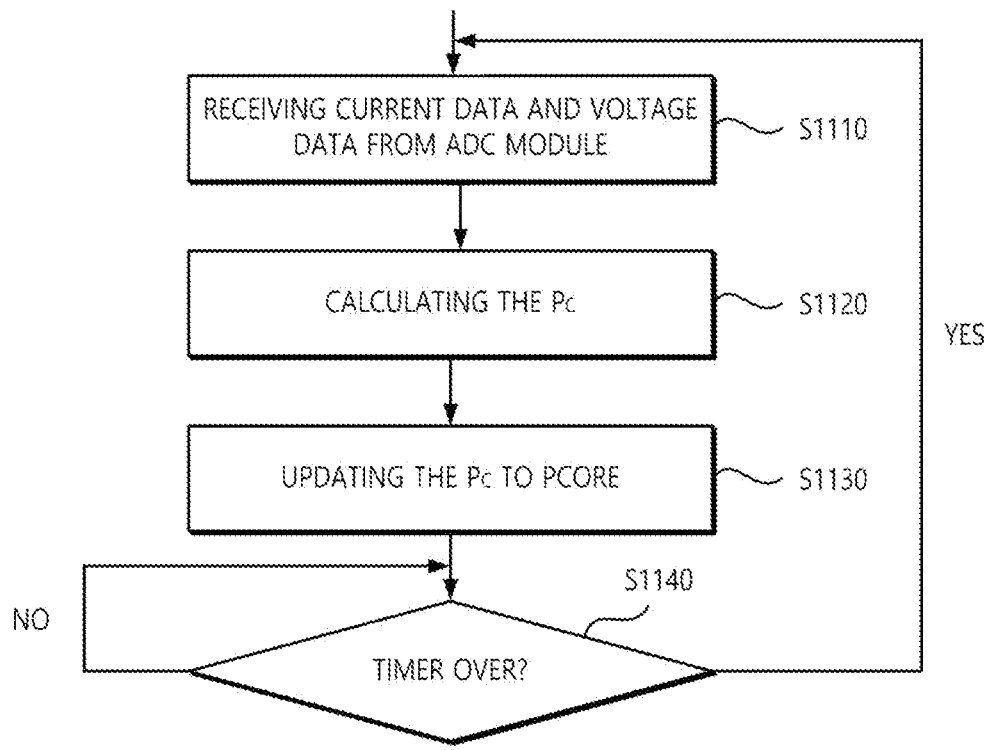
FIG. 10 is a flowchart of an operating method of a management core according to some embodiments of the present disclosure.

FIG. 10 is a flowchart of an operating method of a management core according to some embodiments of the present disclosure.

Referring to FIG. 10, in some embodiments, the management core 1111 may receive at least one current value and at least one voltage value from an ADC module (S1110).

The management core 1111 may calculate the real-time power value $P_C$ from the at least one current value and the at least one voltage value received in operation S1110 (S1120). For example, when at least one line includes two lines, the management core 1111 may calculate the real-time power value $P_C$ based on Equation 5 to Equation 7 above.

The management core 1111 may update the calculated real-time power value $P_C$ to the performance core 1112 (S1130).

Operations S1110 to S1130, which may be performed by the management core 1111, may be performed every given update period. To this end, the management core 1111 may set a timer for checking an update cycle and may determine whether the timer expires (S1140). When the timer does not expire (NO from operation S1140), the management core 1111 may cycle without performing the operations S1110 to S1130. When the timer expires (YES from operation S1140), the management core 1111 may determine that the update cycle arrives and may repeatedly perform operations S1110 to S1130.

Figure 11:
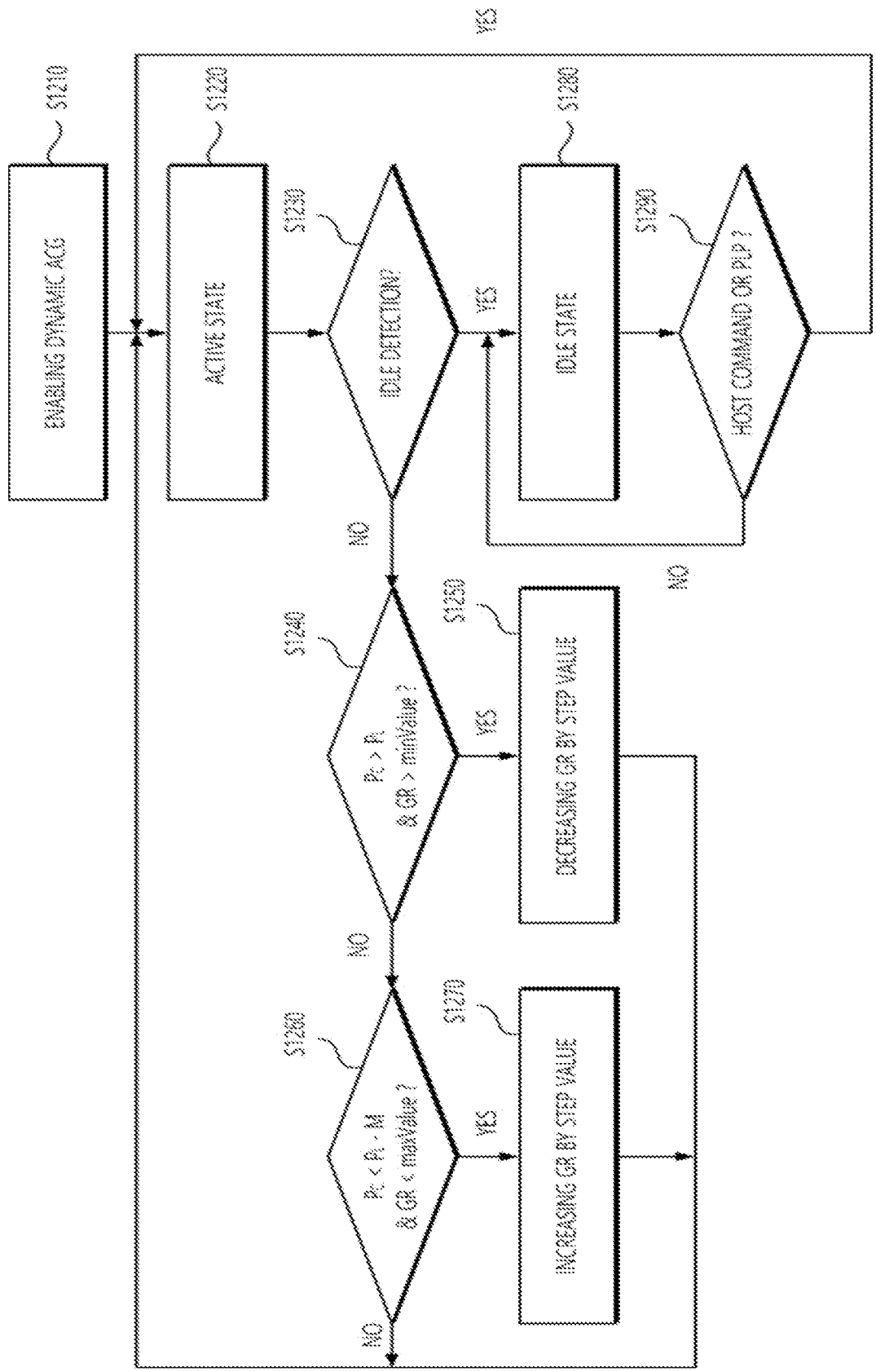
FIG. 11 is a flowchart of an operating method of a performance core according to some embodiments of the present disclosure.

FIG. 11 is a flowchart of an operating method of a performance core according to some embodiments of the present disclosure.

Referring to FIG. 11, in some embodiments, the performance core 1112 may enable the dynamic ACG when the power is supplied to the storage device 1000 so as to be driven (S1210). As the dynamic ACG is enabled, given clock gear ratio values may be declared.

As the dynamic ACG is enabled, the performance core 1112 may switch the state of the storage device 1000 to the active state (S1220). In the active state, various control operations of the storage controller 1100 may be performed. Also, dynamic ACG-related operations of the management core 1111 and the performance core 1112 may be performed.

The performance core 1112 detects the idle state (S1230). For example, when there is no data transfer from the host device 10 to the storage device 1000, the performance core 1112 may determine that the idle state is detected.

When it is determined that the idle state is not detected, the performance core 1112 may compare the real-time power value $P_C$ with a given power limit value $P_L$, and may compare the present value of the clock gear ratio with the given lower limit value (S1240). The real-time power value $P_C$ may be received from the management core 1111.

When it is determined in operation S1240 that the real-time power value $P_C$ is greater than the given power limit value $P_L$ and the present value of the clock gear ratio is greater than the given lower limit value, the performance core 1112 may decrease the clock gear ratio (S1250). For example, operation S1250 may be performed for each step value of the clock gear ratio.

When it is determined that the real-time power value $P_C$ is smaller than the given power limit value $P_L$ and the present value of the clock gear ratio is smaller than the given lower limit value, in operation S1250, the performance core 1112 may compare the real-time power value $P_C$ and a difference between the given power limit value $P_L$ and a given margin value "M" and compare the present value of the clock gear ratio and the given upper limit value (S1260).

When it is determined that the real-time power value $P_C$ is smaller than the difference between the given power limit value $P_L$ and the given margin value "M" and the present value of the clock gear ratio is smaller than the given upper limit value, the performance core 1112 may increase the clock gear ratio (S1270). For example, operation S1270 may be performed for each step value of the clock gear ratio.

When the idle state is detected in operation S1230, the performance core 1112 may switch the state of the storage device 1000 to the idle state (S1280). Also, when the storage device 1000 enters the idle state, the performance core 1112 may adjust the clock gear ratio to the lower limit value.

The performance core 1112 may determine whether a host command or a PLP exists in the idle state (S1290). When it is determined that the host command or PLP exists, the performance core 1112 may perform operation S1220 such that the storage device 1000 again enters the active state.

Through the operating method of the storage device 1000 according to the above embodiments, the storage device 1000 may calculate the total power consumption of the storage device 1000 in real time, and the storage controller 1100 may adjust (e.g., may adjust automatically) the frequency of the driving clock signal of an IP of an upper level, such as the storage controller 1100, depending on the calculated power consumption. Accordingly, the power optimization is possible. According to the above description, when compared to the power optimization based on the operation of the conventional storage device, issues such as resource consumption and a human error may be solved or reduced. Also, the power optimization may be possible even when elements or environments of the storage device 1000 are changed.

Figure 12:
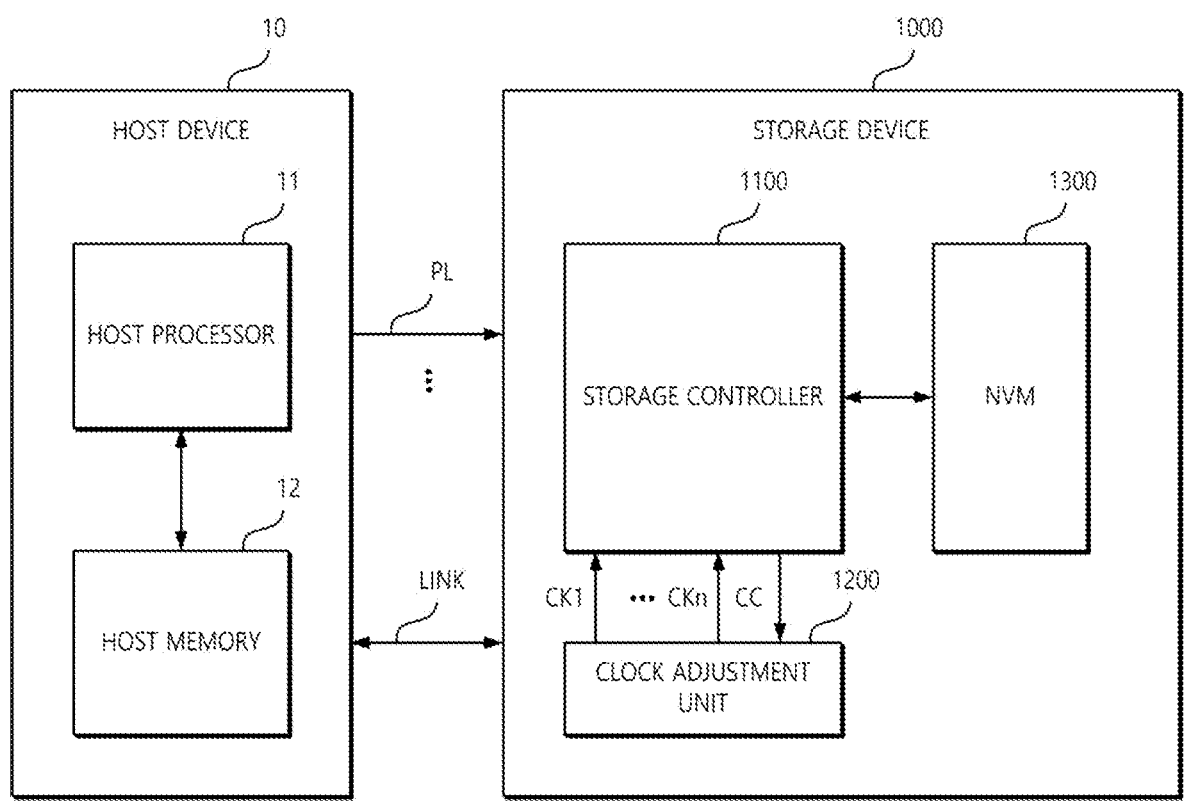
FIG. 12 is a diagram illustrating a storage system according to some embodiments of the present disclosure.

FIG. 12 is a diagram illustrating a storage system according to some embodiments of the present disclosure.

Referring to FIG. 12, a storage system 1 according to some embodiments includes the storage device 1000 according to the above embodiments and the host device 10 connected with the storage device 1000.

The host device 10 may include a host processor 11 and a host memory 12. The host processor 11 may control the operation of the host device 10. For example, the host processor 11 may execute an operating system (OS) for controlling peripheral devices including the storage device 1000. For example, the host processor 11 may include an arbitrary processor such as a central processing unit (CPU).

The host memory 12 may store instructions executable by the host processor 11 and data processed/to be processed by the host processor 11. For example, the host memory 12 may include a volatile memory (VM) and/or a non-volatile memory (NVM).

The storage device 1000 may be accessed by the host device 10. That is, the storage device 1000 may receive a request, a command, or any other data from the host device or may send a response to the request or data stored in the NVM 1300. The storage device 1000 may be connected with the host device 10 through at least one power line $P_L$ and may receive the power. Alternatively, unlike the example illustrated in FIG. 12, the power may be supplied through an external power line. The storage device 1000 may be connected with the host device 10 through a link interface LINK and may send or receive data.

According to the above embodiments, the storage controller 1100 included in the storage device 1000 may calculate the real-time power value of the storage device 1000 from a power line and may generate the clock control signal CC based on the real-time power value. According to the above embodiments, the clock adjustment unit 1200 included in the storage device 1000 may receive the clock control signal CC from the storage controller 1100 and may adjust the plurality of clock signals CK1 to CKn depending on the clock control signal CC.

According to the present disclosure, a storage device may be provided that makes power optimization possible by calculating power consumption of the storage device in real time and automatically adjusting a frequency of a driving clock signal of the storage device based on the calculated power consumption. A storage system including the storage device, and an operating method of operating the storage device, may also be provided.

While the present disclosure has been described with reference to some embodiments thereof, it will be apparent to those of ordinary skill in the art that various changes and modifications may be made thereto without departing from the scope of the present disclosure as set forth in the following claims.

What is claimed is:
1. A storage device comprising:
a non-volatile memory;
a storage controller connected with the non-volatile memory, and configured to calculate a real-time power value of the storage device using at least one current value and at least one voltage value received from an ADC module, the storage controller further configured to generate a clock control signal based on the real-time power value, wherein the ADC module is connected with at least one line that is configured to supply power to the storage device and wherein the ADC module is configured to measure the at least one current value and the at least one voltage value; and
a clock adjustment unit configured to receive the clock control signal and adjust a plurality of clock signals used to drive the storage controller based on the clock control signal, the clock adjustment unit further configured to send the plurality of clock signals that were adjusted based on the clock control signal to the storage controller,
wherein the clock control signal, used to adjust a clock gear ratio set for each of the plurality of clock signals, is generated based on a present value of the clock gear ratio and a result of a comparison of the real-time power value and a predefined upper power limit value.

2. The storage device of claim 1, wherein the storage controller includes:
   a first core configured to calculate the real-time power value from the at least one current value and the at least one voltage value; and
   a second core different from the first core and configured to receive the real-time power value from the first core and generate the clock control signal.

3. The storage device of claim 2, wherein, when the real-time power value is greater than the predefined upper power limit value and the present value of the clock gear ratio is greater than a given lower limit value, the second core is configured to generate the clock control signal such that the clock gear ratio is decreased, and the clock adjustment unit is configured to adjust at least one of the plurality of clock signals to decrease a frequency thereof in response to receiving the clock control signal.

4. The storage device of claim 2, wherein, when the real-time power value is smaller than a difference between the predefined upper power limit value and a given margin value and the present value of the clock gear ratio is smaller than a given upper limit value, the second core is configured to generate the clock control signal such that the clock gear ratio is increased, and the clock adjustment unit is configured to adjust at least one of the plurality of clock signals to increase a frequency thereof in response to receiving the clock control signal, and
   wherein the given margin value is set such that a rate at which the clock gear ratio is adjusted does not exceed a threshold value.

5. The storage device of claim 2, wherein, when the storage device is in an idle state, the second core is configured to generate the clock control signal such that the clock gear ratio is adjusted to a given lower limit value.

6. The storage device of claim 2, wherein, when the storage device is in an active state, the second core is configured to generate the clock control signal such that the clock gear ratio is between a given lower limit value and a given upper limit value.

7. The storage device of claim 2, wherein the first core is configured to send the real-time power value to the second core periodically, and
   wherein the storage controller is configured to control one or more components included in the storage device based on the plurality of clock signals that were adjusted.

8. The storage device of claim 2, wherein the clock adjustment unit includes:
   a clock oscillator configured to generate a reference clock;
   a plurality of phase locked loops (PLLs) configured to generate the plurality of clock signals by converting the reference clock based on a plurality of components included in the storage device; and
   a plurality of clock gears configured to adjust the plurality of clock signals based on the clock gear ratio.

9. The storage device of claim 2, wherein the clock gear ratio is an adjustment ratio for stepwise adjusting frequencies of the plurality of clock signals.

10. The storage device of claim 1, wherein the ADC module is a first ADC module,
    wherein the storage device further comprises a second ADC module connected between the at least one line and the storage controller, and
    wherein the second ADC module is configured to measure a driving voltage of the storage controller.

11. The storage device of claim 10, wherein the second ADC module is connected between the at least one line and the non-volatile memory, and
    wherein the second ADC module is configured to measure a driving voltage of the non-volatile memory.

12. An operating method of a storage device which includes a storage controller, the method comprising:
    calculating a real-time power value of the storage device using at least one current value and at least one voltage value received from an ADC module, wherein the ADC module is connected with at least one line that supplies power to the storage device and wherein the ADC module measures the at least one current value and the at least one voltage value;
    generating a clock control signal based on the real-time power value;
    adjusting a plurality of clock signals used to drive the storage controller based on the clock control signal; and
    sending the plurality of clock signals to the storage controller,
    wherein adjusting the plurality of clock signals comprises using the clock control signal to adjust a clock gear ratio set for each of the plurality of clock signals, based on a present value of the clock gear ratio and a result of a comparison of the real-time power value and a predefined upper power limit value.

13. The method of claim 12, further comprising:
    measuring a plurality of current values and a plurality of voltage values from the at least one line.

14. The method of claim 12, further comprising:
    when the real-time power value is greater than the predefined upper power limit value and the present value of the clock gear ratio is greater than a given lower limit value, generating the clock control signal such that the clock gear ratio decreases.

15. The method of claim 12, further comprising:
    determining whether the storage device is in an idle state; and
    when the storage device is in the idle state, generating the clock control signal such that the clock gear ratio is adjusted to a given lower limit value.

16. The method of claim 12, further comprising:
    controlling, by the storage controller, one or more components included in the storage device based on the plurality of clock signals that were adjusted,
    wherein the real-time power value is calculated periodically.

17. The method of claim 12, wherein the clock gear ratio is an adjustment ratio for stepwise adjusting frequencies of the plurality of clock signals.

18. A storage system comprising:
    a host device; and
    a storage device connected with the host device,
    wherein the storage device includes:
      a non-volatile memory;
      a storage controller connected with the non-volatile memory, the storage controller configured to: calculate a real-time power value of the storage device using at least one current value and at least one voltage value received from an ADC module, and generate a clock control signal based on the real-time power value, wherein the ADC module is connected with at least one line that supplies power to the storage device and wherein the ADC module measures the at least one current value and the at least one voltage value; and a clock adjustment unit that is configured to adjust a plurality of clock signals used to drive the storage controller based on the clock control signal and further configured to send the plurality of clock signals to the storage controller, and wherein the storage controller includes:
a first core configured to receive the at least one current value and the at least one voltage value from the ADC module, and to calculate the real-time power value from the at least one current value and the at least one voltage value; and
a second core configured to receive the real-time power value from the first core and to generate the clock control signal, the clock control signal used to adjust a clock gear ratio set for each of the plurality of clock signals, based on a present value of the clock gear ratio and a result of a comparison of the real-time power value and a predefined upper power limit value.

19. The storage system of claim 18, wherein the second core is configured to:

when the real-time power value is greater than the predefined upper power limit value and the present value of the clock gear ratio is greater than a given lower limit value, generate the clock control signal such that the clock gear ratio is decreased; and when the real-time power value is smaller than a difference between the predefined upper power limit value and a given margin value and the present value of the clock gear ratio is smaller than a given upper limit value, generate the clock control signal such that the clock gear ratio is increased.

20. The storage system of claim 18, wherein, when the storage device is in an idle state, the second core is configured to generate the clock control signal such that the clock gear ratio is adjusted to a given lower limit value, and wherein the second core is configured to determine that the storage device is in the idle state when there is no data transfer between the host device and the storage device.

* * * * *